Dec. 3, 1968 S. J. SCHWARTZ 3,414,890

MAGNETIC MEMORY INCLUDING DELAY LINES IN BOTH ACCESS AND SENSE WINDINGS

Filed Sept. 28, 1964 4 Sheets-Sheet 1

INVENTOR
SIDNEY J. SCHWARTZ

BY Louis A. Kline
Richard G. Stahr

HIS ATTORNEYS

INVENTOR
SIDNEY J. SCHWARTZ
BY Louis A. Kline
Richard G. Stahr
HIS ATTORNEYS

Dec. 3, 1968 S. J. SCHWARTZ 3,414,890

MAGNETIC MEMORY INCLUDING DELAY LINES IN BOTH ACCESS AND SENSE WINDINGS

Filed Sept. 28, 1964 4 Sheets-Sheet 3

INVENTOR
SIDNEY J. SCHWARTZ
BY Louis A Kline
Richard G. Stahr
HIS ATTORNEYS

INVENTOR
SIDNEY J. SCHWARTZ
BY Louis A Kline
Richard G. Stahr
HIS ATTORNEYS 3,414,890

MAGNETIC MEMORY INCLUDING DELAY LINES IN BOTH ACCESS AND SENSE WINDINGS

Sidney J. Schwartz, Dayton, Ohio, assignor to The National Cash Register Company, Dayton, Ohio, a corporation of Maryland Filed Sept. 28, 1964, Ser. No. 399,499
2 Claims. (Cl. 340—174)

ABSTRACT OF THE DISCLOSURE

Magnetic memory matrices, which have series-connected delay circuit devices that are interconnected between groups of memory elements which correspond to different memory bit positions of the memory to form sensing paths and drive addressing paths, are disclosed.

The present invention relates to static magnetic memory accessing and, more specifically, to a static magnetic memory accessing arrangement wherein the "T" or Time coordinate is employed.

With magnetic memory devices of the static type, such as cores, rods, bit wires, thin films, or cryogenic devices, stored binary information is represented by respective states of magnetic remanence of the storage cells. Selected polarity "read" signals reverse the stable state of magnetic remanence of those memory cells which are in the significant stable state, thereby inducing a signal, signifying the presence of a significant bit in that cell, in a sense or readout winding which is magnetically coupled thereto. This arrangement is well known in the art and, therefore, needs no amplification for purposes of this specification.

There has been considerable activity directed to arrangements which will reduce the number of current driver devices and sense amplifier devices which are necessary with memory systems of this type and to increase the sequential operation speed. As the use of static magnetic memory systems is increasing, the requirement of a reliable accessing system which will reduce the number of expensive components and provide for high-speed sequential operation is apparent.

It is, therefore, an object of this invention to provide an improved static magnetic memory accessing system.

It is an additional object of this invention to provide an improved static magnetic memory accessing system wherein the propagation time of significant signal pulses through the lines of the system is employed to effect signal separation.

It is another object of this invention to provide an improved static magnetic memory accessing system wherein the propagation time of significant signal pulses through the lines of the system is employed to reduce the number of required components and to provide for high-speed sequential operation.

In accordance with this invention, an improved static magnetic memory accessing system is provided wherein the propagation of significant signal pulses through selected lines of the system is selectively delayed for predetermined periods, whereby the location of the signal pulse front within the system at any time during the propagation period thereof may be employed for purposes of signal separation.

Figure 1:
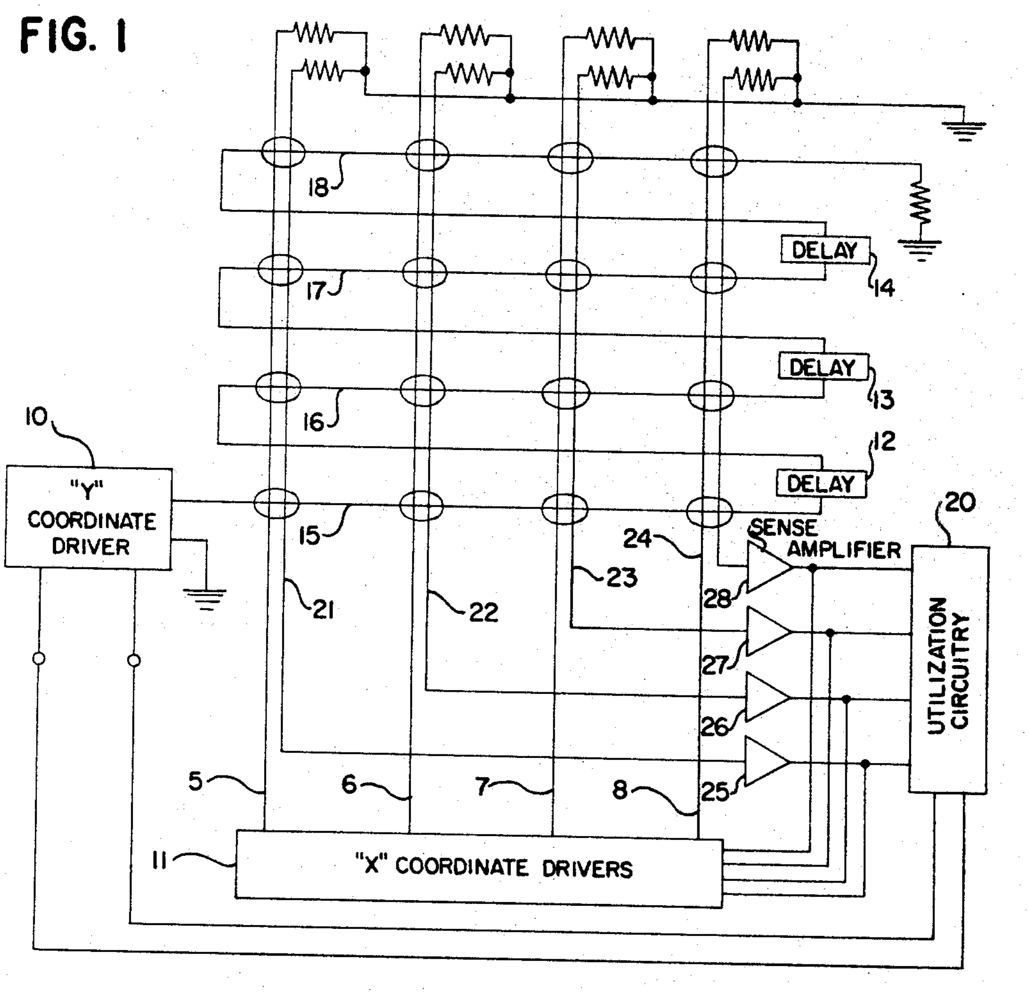
Figure 2:
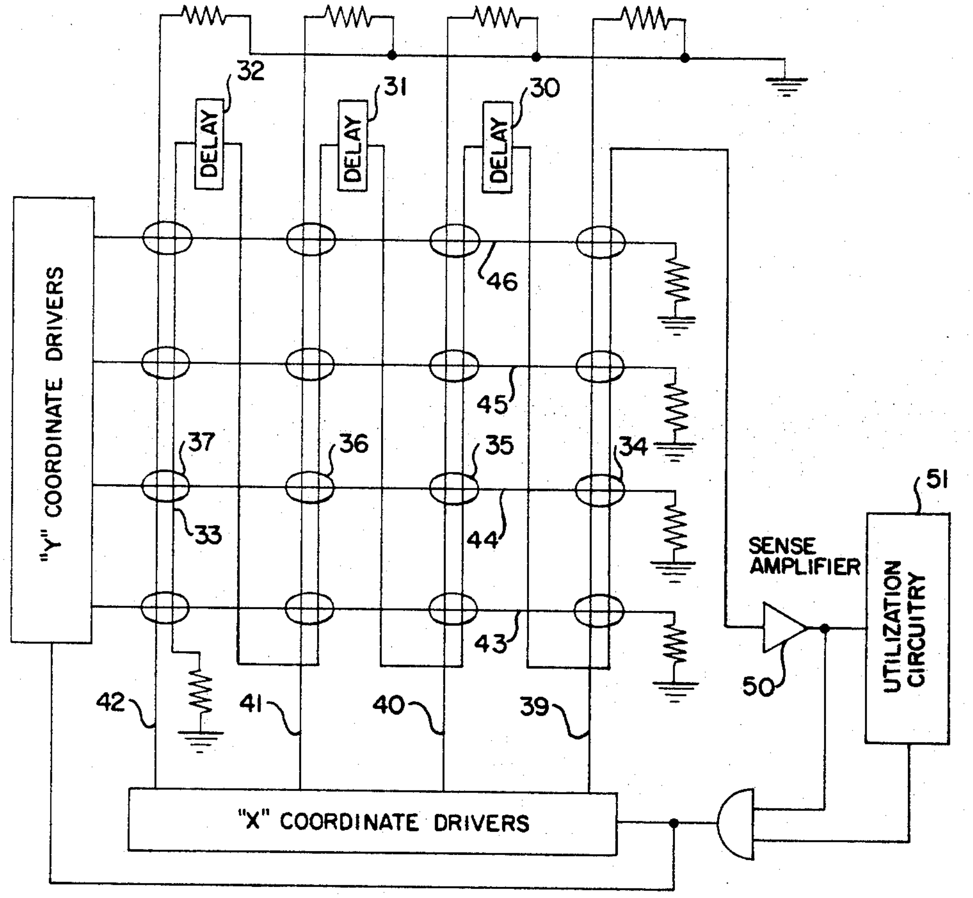
Figure 3:
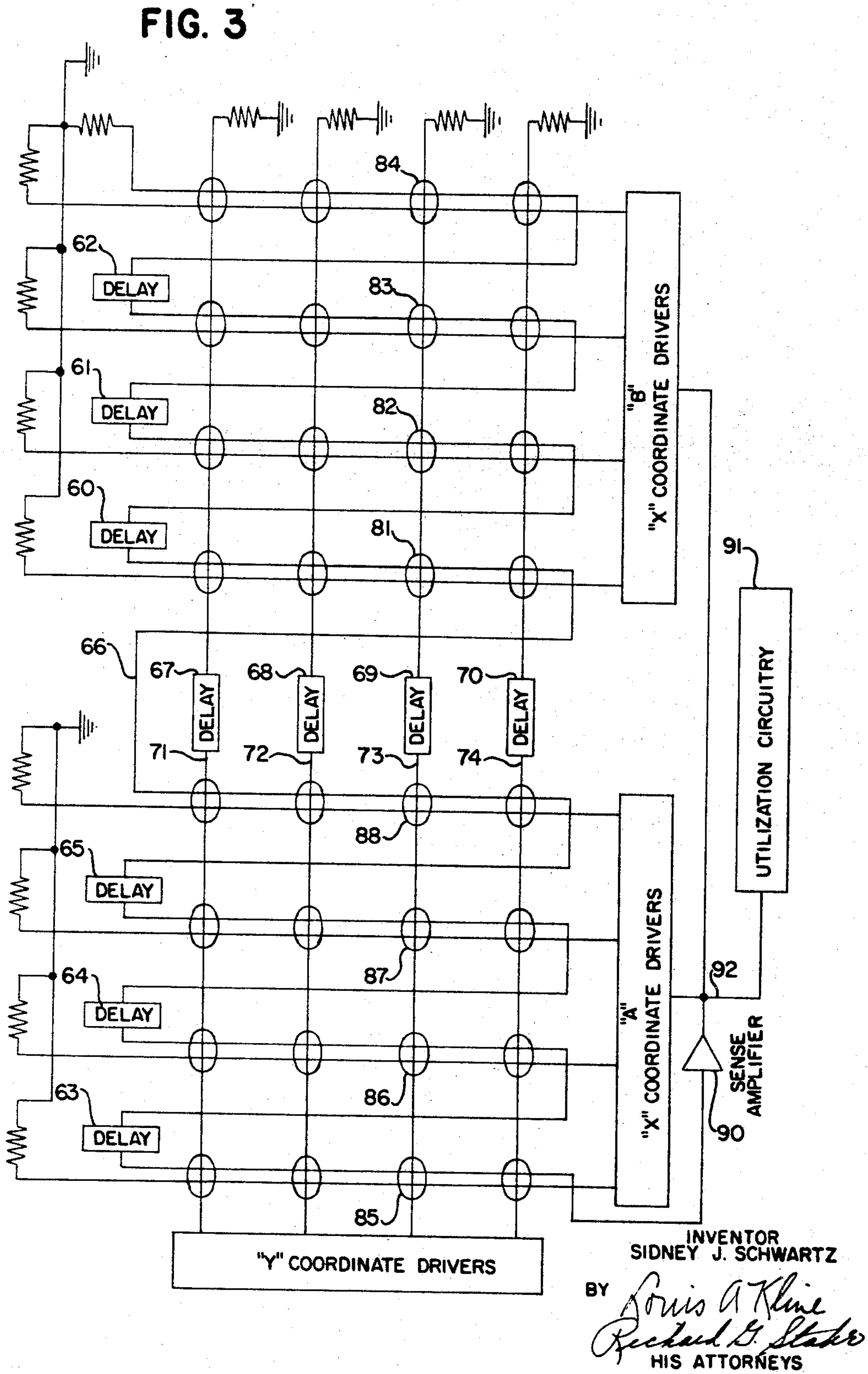
Figure 4:
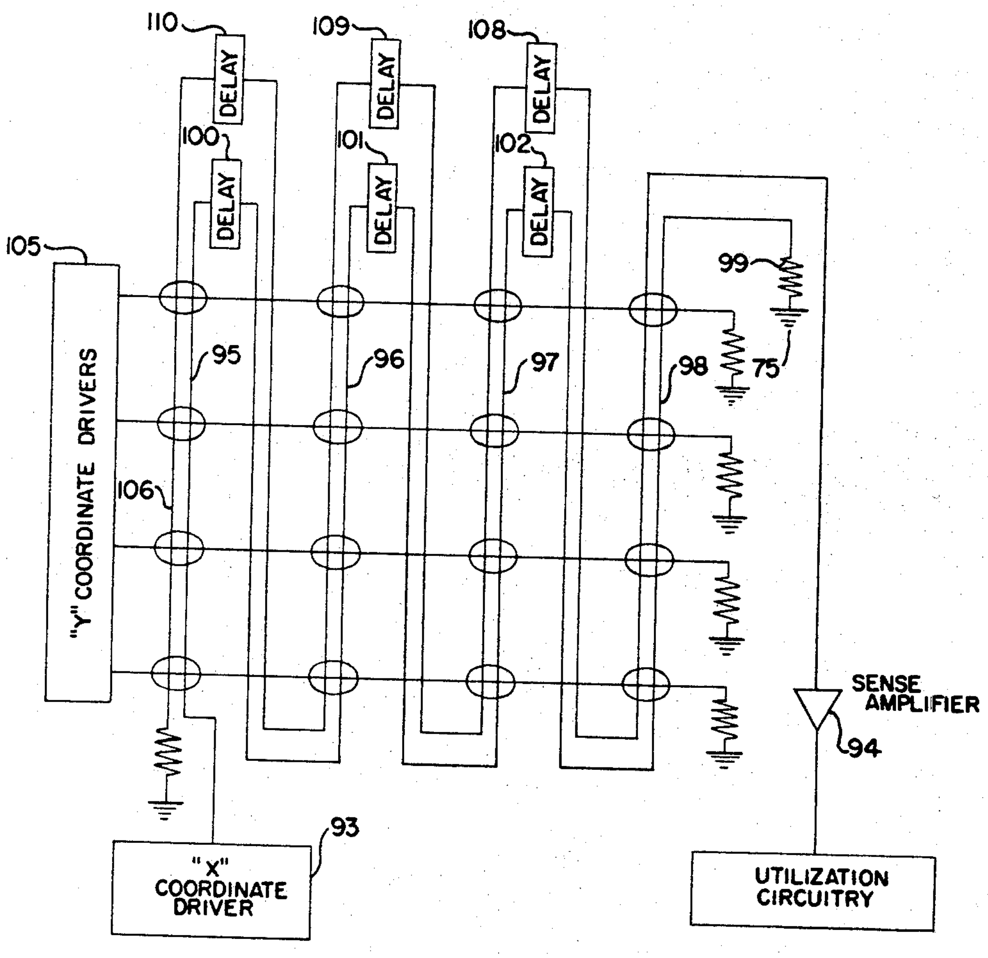

For a better understanding of the present invention, together with additional objects, advantages, and features thereof, reference is made to the following description and accompanying drawings, in which:

FIGURE 1 is a schematic diagram of a static magnetic memory system embodying the features of this invention in one of the address accessing circuit lines thereof, FIGURE 2 is a schematic diagram of a static magnetic memory system embodying the features of this invention in the sense accessing circuit line thereof, FIGURE 3 is a schematic diagram of a static magnetic memory system embodying the features of this invention in one of the address accessing circuit lines and the sense accessing circuit line thereof, and FIGURE 4 is a schematic diagram of a static magnetic memory system embodying an alternate arrangement of the features of this invention.

FIGURES 1, 2, 3, and 4 schematically set forth typical static magnetic memory systems embodying the features of this invention wherein the memory elements or storage cells are schematically illustrated as ovals and will be assumed to be magnetic cores of a material having substantially square hysteresis loop characteristics. The systems set forth in the drawings are for purposes of illustrating this novel concept. It is not intended nor is to be inferred that this invention be limited to these precise applications, which are only four of a myriad of arrangements of memory systems of this type. It is to be specifically understood that other magnetic storage elements, such as bit wires, rods, thin films, cryogenic devices, etc., and that other wiring, threading, and driving arrangements may be employed without departing from the spirit of the invention.

As is well known in the art, binary information stored in static magnetic storage systems is represented by the state of magnetic remanence of the several storage cells, whether cores or areas upon a thin film surface or other magnetizable medium. In systems of this type, the binary representation of any character may be stored in any selected one of a plurality of groups of these memory cells, the individual memory cells within each group corresponding to a bit position of the binary representation, and respective memory cells of all of the groups comprising sets of those memory cells which correspond to the same bit position. To access these memory devices, accessing circuitry usually including at least two separate address access circuits and a sense access circuit is magnetically coupled to the plurality of memory cells. One method of producing the selected state of magnetic remanence in the storage cells is to apply coincident half-select "write" current pulses through selected coordinate address access circuit lines. As only half-select currents are used in systems of this type, only that storage cell which is magnetically coupled to both energized address circuit lines is driven to the selected state of magnetic remanence. To read out the stored information, the memory cells are interrogated by reverse "read" current pulses which may be coincident half-select or full-select; therefore, those memory cells which are in the selected state of magnetic remanence are reversed. Upon reversal of the state of magnetic remanence of any memory cell, a pulse is induced in the sense access circuit line which is also magnetically coupled thereto.

To facilitate the description, in all of the figures the ovals which represent the magnetic storage or memory cells are arranged in rows and columns. Each row of memory cells is a "group" of memory cells in which the binary representation of any character may be stored, and each column of memory cells is a "set" of those respective memory cells of all the groups which correspond to the same bit position of the binary representation. These terms will be used throughout the specification and claims. It is to be specifically understood, however, that alternate arrangements may be employed without departing from the spirit of this invention.

FIGURE 1 schematically illustrates a typical static magnetic memory system having a plurality of magnetic memory cells and embodying the features of this invention in one of the address access circuit lines thereof. In this figure there are shown a first address access circuit, having four sections 15, 16, 17, and 18, which is magnetically coupled to all of the memory cells, a plurality of second address access circuits, 5, 6, 7, and 8, each of which is magnetically coupled to all of the memory cells of a respective set of those memory cells which correspond to the same bit position, and a plurality of sense accessing circuits, 21, 22, 23, and 24, each of which is magnetically coupled to all of the memory cells of a respective set of those memory cells which correspond to the same bit position. A plurality of delay circuit devices, 12, 13, and 14, are employed, and each is connected in series in the first address access circuit between each group of memory cells. To facilitate the description of this figure, the first address access circuit will be referred to as the Y coordinate drive line, the second address access circuits will be referred to as the X coordinate drive lines, and the sense access circuits will be referred to as the sense lines. With prior art systems of this type, an X coordinate driver would be required for each of the X coordinate drive lines 5, 6, 7, and 8, and a Y coordinate driver would be required for each of the Y coordinate drive line sections 15, 16, 17, and 18. By incorporating the novel features of this invention, it may be noted that only a single Y coordinate driver 10 is necessary and that Y coordinate drive line sections 15, 16, 17, and 18 are connected in series. As the Y coordinate driver 10 may be of any conventional design well known in the art and forms no part of this invention, it has been herein indicated in block form. Similarly, the X coordinate drivers for each of the X coordinate drive lines 5, 6, 7, and 8 may be any one of those conventional drivers well known in the art, and, therefore, they have been indicated by a block 11.

Included in series between each group of memory cells in the Y coordinate drive line is a respective delay circuit device, herein indicated in block form at reference numerals 12, 13, and 14. These delay circuit devices may be of conventional design, and, in a practical application of the features of this invention, each was designed to introduce an eleven-nanosecond delay of the half-select signal pulse initiated by the Y coordinate driver 10 and propagated through the Y coordinate drive line sections 15, 16, 17, and 18.

As the Y coordinate read signal pulse is initiated by the Y coordinate driver 10 and propagates down the Y coordinate drive line section 15, all of those memory cells linked thereby which are in the selected significant state of magnetic remanence are reversed, thereby inducing a readout signal pulse in each of the sense circuit lines 21, 22, 23, or 24 of the sense access circuitry, also magnetically coupled thereto, in a manner well known in the art. These readout signal pulses are amplified in conventional respective sense amplifiers 25, 26, 27, and 28 and are directed, in parallel, to the utilization circuitry, which, since it forms no part of this invention and may be of conventional design, is illustrated herein in block form at reference numeral 20.

After the delay which has been introduced by the delay circuit device 12, the front of the Y coordinate signal pulse continues to propagate down the Y coordinate drive line section 16, thereby reversing those memory cells linked thereby which are in the selected state of magnetic remanence, thereby inducing readout signal pulses in the respective sense circuit lines 21, 22, 23, or 24 of the sense access circuitry. These readout signal pulses are also amplified by the respective conventional sense amplifiers 25, 26, 27, or 28 and are directed, in parallel, to the utilization circuitry 20.

After the delay which has been introduced by the delay circuit device 13, the wave front of the Y coordinate signal pulse continues to propagate down the Y coordinate drive line section 17, thereby reversing the state of magnetic remanence of those cells linked thereby which are in the selected state of magnetic remanence, thereby inducing readout signal pulses in the respective sense lines 21, 22, 23, or 24 of the sense access circuitry. These readout signal pulses are also amplified by the respective conventional sense amplifiers 25, 26, 27, and 28 and directed, in parallel, to the utilization circuitry 20.

At the conclusion of the delay introduced by the delay circuit device 14, the wave front of the Y coordinate readout signal pulse propagates through the Y coordinate drive line section 18, and the state of magnetic remanence of those memory cells linked thereby which are in the selected state of magnetic remanence is reversed, thereby inducing a readout signal pulse in the respective sense lines 21, 22, 23, or 24 of the sense access circuitry. These readout pulses also are amplified by the respective conventional sense amplifiers 25, 26, 27, and 28 and directed, in parallel, to the utilization circuitry 20.

From this description, it is apparent that the information stored in each row or group of memory cells is directed, in parallel, to the utilization circuitry 20 at different times during the propagation of the Y coordinate readout signal pulse through the respective Y coordinate drive line sections 15, 16, 17, and 18 of the address access circuitry. To separate the desired information thus read out from the information which is not desired, the utilization circuitry may be arranged through a proper strobing circuit system to interrogate the output circuits of the sense amplifiers 25, 26, 27, and 28 only during that time that the wave front of the Y coordinate readout signal is being propagated through the Y coordinate drive line section which links the memory cells in which the desired information is stored.

Although non-destructive readout is preferred, in the event the readout is destructive and the information stored in this system is destroyed during the readout operation, it may be necessary that the information be rewritten back into storage. Therefore, through a proper logic arrangement well known in the art, the utilization circuit 20 may be arranged to institute a "write" signal to the Y coordinate driver 10 and to the X coordinate driver 11 to which the information appearing at the output circuits of each of the sense amplifiers 25, 26, 27, and 28 is directed, as indicated. Upon receipt of a "write" command from the utilization circuitry, the Y coordinate driver 10 initiates an opposite polarity, half-select "write" pulse which is propagated through the Y coordinate drive line sections 15, 16, 17, and 18 and the delay circuit devices 12, 13, and 14, in a manner previously described during the readout signal. The X coordinate drivers may be arranged to initiate half-select "write" pulses in those lines in which a selected binary bit is to be stored in a corresponding memory cell during those periods of time that the Y coordinate "write" signal pulse is energizing the proper Y coordinate drive line section 15, 16, 17, or 18. That is, when the Y coordinate "write" signal pulse is energizing the Y coordinate drive line section 13, the X coordinate driver 11 may energize those lines 5, 6, 7, or 8 as determined by the memory cell in which a significant bit is to be stored. As the wave front of the Y coordinate "write" signal pulse successively energizes the Y coordinate drive line sections 16, 17, and 18, after the delays introduced by the respective delay circuit devices 12, 13, and 14, the X coordinate drivers may be timed to energize those X coordinate drive lines 6, 7, or 8 which correspond to the memory cells in which significant bits are to be stored.

FIGURE 2 schematically illustrates an alternate embodiment of the unique features of the present invention. In this figure there are shown a plurality of first address access circuits, 43, 44, 45, and 46, each of which is magnetically coupled to all of the memory cells of a respective group, a plurality of second address access circuits, 39, 40, 41, and 42, each of which is magnetically coupled to all of the memory cells of a respective set of those memory cells which correspond to the same bit position, and a sense access circuit 33, which is magnetically coupled to all of the memory cells. A plurality of delay circuit devices, 30, 31, and 32, are employed, and each is connected in series in the sense access circuit between each set of those memory cells which correspond to the same bit position. As with the previous figure, the address access circuit lines 43, 44, 45, and 46 will be referred to as the Y coordinate drive lines, and the address access lines 39, 40, 41, and 42 will be referred to as the X coordinate drive lines.

Assuming that the binary bit "1" is stored in each of the group of memory cells 34, 35, 36, and 37, the Y coordinate drive line 44, the address access circuit which is magnetically coupled to all of the cells of the group, is energized by a "read" signal from the corresponding Y coordinate driver, and, simultaneously therewith, the X coordinate drive lines 39, 40, 41, and 42 are energized by a "read" signal from the corresponding X coordinate driver. These coordinate read currents reverse the state of magnetic remanence of the memory cells 34, 35, 36, and 37, thereby inducing a readout signal in the sense access circuit line 33 which is magnetically coupled to all of the cells, in a manner well known in the art.

The readout signal which is induced in the sense access circuit line 33 upon the reversal of the state of magnetic remanence of the memory cell 34 arrives at the sense amplifier 50 substantially instantaneously. However, the readout signal pulses induced in the sense access circuit line 33 upon the reversal of the state of magnetic remanence of the memory cells 35 and 36 and 37, although they occur substantially simultaneously with that produced upon the reversal of magnetic remanence of the cell 34, are delayed in arriving at the sense amplifier 50 because of the delays introduced by the delay circuit devices 30, 31, and 32, connected in series in the sense access circuit line 33.

That is, the readout signal induced in the sense access circuit line 33 upon the reversal of the state of magnetic remanence of the memory cell 35 arrives at the sense amplifier 50 at a time later than that of the signal from the memory cell 34 by a period of time equal to the delay designed into the delay circuit device 30. The signal produced by the memory cell 36, of course, arrives at the sense amplifier 50 at a time later than that produced in the memory cell 34 by the period of time introduced by the delay circuit devices 30 and 31. Similarly, the readout signal induced in the sense access circuit line 33 upon the reversal of the state of magnetic remanence of the memory cell 37 arrives at the sense amplifier 50 at a time period later than that of a signal produced in the memory cells 34, 35, and 36 by a period of time equal to the delay introduced by the delay circuit devices 30, 31, and 32, respectively. In a practical application of the novel features of this invention, the delay introduced by each of the delay circuit devices 30, 31, and 32 was approximately eleven nanoseconds.

From this description, it is apparent that the four signals induced substantially simultaneously in the sense access circuit line 33 upon the coincident energization by a "read" current of the Y coordinate drive line 44 and the X coordinate drive lines 39, 40, 41, and 42 arrive at the sense amplifier 50 as a series of pulses separated by a time determined by the delay circuit devices 30, 31, and 32 and are applied, in series, to the utilization circuitry 51, which, since it forms no part of this invention, is herein indicated in block form.

To write information into the memory cells of this embodiment, it is only necessary that "write" coincident currents be applied simultaneously to the two address access circuits, Y drive line 44 and successively to X coordinate drive lines 39, 40, 41, and 42, in a conventional manner.

With this embodiment, it may be noted that only one sense amplifier is required.

Referring to FIGURE 3, a third embodiment, incorporating a combination of the embodiments illustrated in FIGURES 1 and 2, is schematically set forth.

In this embodiment, it may be noted that delay circuit devices 60, 61, 62, 63, 64, and 65 are included in series in sense access circuit line 66 between each set of those memory cells which correspond to the same bit position, and delay circuit devices 67, 68, 69, and 70 are included in the first address access circuit lines designated as the "Y" coordinate drive lines, 71, 72, 73, and 74, between respective groups of memory cells.

Assuming that the information stored in the memory cells 81, 82, 83, and 84 is desired to be read out, a full select readout signal may be applied to the Y coordinate drive line 73 by the corresponding Y coordinate driver, thereby reversing the state of magnetic remanence of those of the magnetic memory cells 81, 82, 83, or 84 which are in that state of magnetic remanence selected to represent the binary digit "1." In this regard, it may be noted that with a full select read signal upon the Y coordinate drive line 73, those magnetic cells 85, 86, 87, and 88 which are in the state of magnetic remanence selected to represent the binary digit "1" will have their state of magnetic remanence reversed, thereby inducing signals in the sense accessing circuit line 66. Therefore, the signals produced on the reversal of the memory cells 85, 86, 87, or 88 will arrive at the sense amplifier 90 as a series of pulses each separated from the others by a period of time as introduced by the delay circuit devices 63, 64, and 65, respectively, in a manner described in regard to the description of FIGURE 2. As these signals are on the sense amplifier 90 side of the delay circuit device 69, they will arrive at the sense amplifier 90 first in time. This series of signals is presented to the utilization circuitry 91, which, since it forms no part of the invention, is herein indicated in block form. As the information stored in the memory cells 85. 86, 87, and 88 is not wanted at this time, a conventional strobing circuit, which serves to reject this first-arriving series of signals, may be included in the utilization circuitry.

After the time in delay induced by the delay circuit 69, the full-select "read" signal applied to the Y coordinate drive line 73 by the corresponding Y coordinate driver reverses the state of magnetic remanence of those of the magnetic cells 81, 82, 83, or 84 which are in that state of magnetic remanence selected to represent the binary digit "1," thereby substantially simultaneously inducing pulses in the sense access circuit line 66, in a manner previously described.

Assuming that a signal is induced in the sense access circuit line 66 at each of these memory cells, the signal produced by the memory cell 81 will propagate toward the amplifier 90 first, followed by the signals induced in the cells 82, 83, and 84, each of which is separated by a period of time as introduced by the respective delay circuit devices 60, 61, and 62, in a manner previously described in connection with the embodiment of FIGURE 2.

This series of pulses will be further delayed by the respective delay circuit devices 65, 64, and 63, thereby permitting ample time for the utilization circuitry 90 to reject the series of pulses produced upon the reversal of the state of magnetic remanence of the memory cells 85, 86, 87, and 88 before the desired series of pulses is presented thereto.

If the information stored in the memory cells 85, 86, 87, and 88 is destroyed, it is necessary that this be rewritten therein. This is easily accomplished by diverting the first series of pulses to the second address accessing circuitry, the X coordinate drive circuitry, through the line 92 by means of conventional gating circuitry within the utilization circuitry 91. Similarly, should the desired information which has previously been read out of the memory cells 81, 82, 83, and 84 be rewritten, the output of the amplifier 90 may be directed to the X coordinate drive circuitry through the line 92 by means of conventional gating circuitry within the utilization circuitry, in a manner well known in the art.

With the embodiment of FIGURE 3, it is obvious that the number of Y coordinate drive circuits and sense amplifier circuits is greatly reduced by the unique features of this invention.

In FIGURE 4 there is illustrated another embodiment of the novel features of this invention, wherein the delay circuit devices are included in the second address access circuit, designated as the X coordinate drive line, and in the sense access circuit between each set of those memory cells which correspond to the same bit position. With this arrangement, only one X coordinate driver 93 and one sense amplifier 94 are required.

The X coordinate drive lines 95, 96, 97, and 98 are connected in series between the X coordinate driver 93 and the termination resistor 99 to the point of reference potential 75. As the X coordinate driver 93 may be of conventional design and one of the several well known in the art, it has been herein shown in block form. Delay circuit devices 100, 101, and 102 are connected in series between the X coordinate drive lines 95 and 96, 96 and 97, and 97 and 98, respectively.

To record information when the memory is in a nondestructive mode, a half-select "write" pulse is initiated by the X coordinate driver 93 and begins propagation down the X coordinate drive line 95. This "write" pulse is successively delayed by the delay circuit devices 100, 101, and 102 and, therefore, appears in the respective X coordinate drive lines 96, 97, and 98 during successive time intervals, as determined by the amount of delay designed into the devices 100, 101, and 102. In a practical application of this invention, this delay was designed to be approximately eleven nanoseconds for each of these devices. Y coordinate drivers, herein indicated in block form at reference numeral 105, may be arranged to initiate the Y coordinate half-select "write" pulses during those time intervals that the X coordinate half-select "write" pulse is traversing the X coordinate drive line of the memory cells in which the information is to be recorded.

To record information in the event that the readout was destructive, separate "write" pulses must be applied by the X coordinate driver 93 to provide for storage in the X coordinate drive lines 95, 96, 97, and 98 for each of the particular storage cells to be set in the significant remanence state. These pulses may be launched by the X coordinate driver 93 at intervals equal to the delay interval introduced by the delay circuit devices per section along the sense or X coordinate lines. When all pulses have propagated to the proper coordinate position, the proper Y coordinate line is pulsed to provide the necessary current coincidence for storage. In the event that the storage element utilizes bi-polar digit pulses for storage, X coordinate driver 93 would supply a bi-polar pulse train with the local priority in each of the drive lines 95, 96, 97, or 98 at the time the Y coordinate pulse is delivered determining whether a binary "1" or "0" is stored.

As information is read out of this device, a full-select reverse polarity of read current may be initiated by the Y coordinate driver corresponding to the drive line which threads those memory cells in which the desired information is stored, thereby reversing those memory cells which are in the significant state of magnetic remanence. The pulses thereby produced in the sense line 106 begin propagating toward the sense amplifier 94. Each of these pulses is delayed by delay devices 108, 109, and 110, connected in series in the address access drive line 106, and appear as a series of pulses at the sense amplifier 94 during successive time intervals as determined by the amount of delay introduced by the delay circuit devices 108, 109, and 110. In the practical application of this device, this period of delay was also approximately eleven nanoseconds. It may be noted that this readout is identical to that shown and described in regard to FIGURE 2.

The features of this invention may be briefly described as a static magnetic accessing arrangement comprising in combination a memory system having a plurality of magnetic memory cells, accessing circuitry including at least two separate address access circuits and a sense access circuit magnetically coupled thereto, and at least one delay circuit device connected in series in a selected one of the access circuit lines. To facilitate the description of the features of this invention, the two address accessing circuits were referred to as Y coordinate drive lines and X coordinate drive lines. It is to be specifically understood that these terms are not to be construed as limiting, as other arrangements of the magnetic memory cells and the accessing circuitry and the sense accessing circuitry may be employed without departing from the spirit of this invention.

It is to be specifically understood that the embodiments herein described are by no means exhaustive but are illustrative of four applications of the novel concepts of this invention.

While a specific embodiment of the present invention has been shown and described, it will be obvious to those skilled in the art that various modifications and substitutions may be made without departing from the spirit of the invention which is to be limited only within the scope of the appended claims.

What is claimed is:

1. A static magnetic memory accessing arrangement comprising in combination a memory system having a plurality of magnetic memory cells wherein the binary representation of any character may be stored in any selected one of a plurality of groups of said memory cells, the individual said memory cells within each of said groups corresponding to a bit position of the binary representation and respective said memory cells of all said groups comprising sets of those memory cells which correspond to the same bit position, access circuit means including a plurality of first address access circuit means each of which is magnetically coupled to all of said memory cells of a respective said group, second address access circuit means magnetically coupled to all of said memory cells, and sense access circuit means magnetically coupled to all of said memory cells, a first plurality of delay circuit devices each of which is connected in series in said first address access circuit means between each of said set of memory cells which correspond to the same bit position, and a second plurality of delay circuit devices each of which is connected in series in said sense access circuit means between each said set of memory cells which correspond to the same bit position.

2. A static magnetic memory accessing arrangement comprising in combination a memory system having a plurality of magnetic memory cells wherein the binary representation of any character may be stored in any selected one of a plurality of groups of said memory cells, the individual said memory cells within each of said groups corresponding to a bit position of the binary representation and respective said memory cells of all said groups comprising sets of those memory cells which correspond to the same bit position, access circuit means including a plurality of first address access circuit means each of which is magnetically coupled to all of said memory cells of at least two of said groups, a plurality of second address access circuit means each of which is magnetically coupled to all of said memory cells of a respective set of those memory cells which correspond to the same bit position, and sense circuit means magnetically coupled to all of said memory cells, a first plurality of delay circuit devices each of which is connected in series in each of said first address access circuit means between those of said groups to which it is coupled, and a second plurality of delay circuit devices each of which is connected in series in said sense access circuit between each said set of those said memory cells which correspond to the same bit position.

References Cited

UNITED STATES PATENTS

| | | | |
|---|---|---|---|
| 2,784,391 | 3/1957 | Rajchman et al. | 340—174 |
| 2,993,196 | 7/1961 | Hughes et al. | 340—174 |
| 3,257,648 | 6/1966 | Chu | 340—174 |
| 3,278,909 | 10/1966 | Borne et al. | 340—174 |

BERNARD KONICK, *Primary Examiner.*

V. P. CANNEY, *Assistant Examiner.*